UNITED STATES PATENT OFFICE.

NICHOLAS W. GADDY, OF NICHOLS, SOUTH CAROLINA.

IMPROVEMENT IN MEDICAL COMPOUNDS FOR HEALING WOUNDS, &c.

Specification forming part of Letters Patent No. 129,469, dated July 16, 1872.

Specification describing a new and useful Improvement in Medical Compound, invented by NICHOLAS W. GADDY, of Nichols, in the county of Marion and State of South Carolina.

This invention and discovery relate to a new and useful compound to be used as a medicine for the cure of diseases, and to be applied externally for healing of wounds and sores on both man and beast; and it consists in the distilled sap of pine, strained, clarified, and suitably prepared for use.

The properties of crude turpentine as a curative agent have long been understood, but owing to its acrid or pungent nature it has never gone into general use, nor has any modification of it been prepared so as to succeed with the public. Simply diluting spirits of turpentine with water does not produce the proper chemical combination; but I have discovered in the course of my experiments that the first product of distillation of the sap or juice of the pine-tree possesses the requisite quantity of water chemically combined with the turpentine or juice of the tree to fit it to be taken internally or to be applied externally as a curative agent for the healing of sickness, wounds, and sores. The first product of distillation is usually termed "slack-water" by the manufacturers of turpentine, and by them is considered worthless.

I utilize this article and prepare it for use for the purposes stated. If necessary, I strain or filter this "slack-water" through any desired medium, so as to purify and clarify it; and then I put it up in suitable packages or bottles for use.

This is a most excellent dentrifice. For cleaning the teeth, purifying the mouth, and sweetening the breath it cannot be surpassed.

Having thus described my invention, I claim as new and desire to secure by Letters Patent—

The medical compound above described, for the purposes specified.

NICHOLAS WARE GADDY.

Witnesses:
J. M. JOHNSON,
JOHN WILCOX.